3,455,690
PHOTOGRAPHIC MATERIAL FOR THE SILVER DYESTUFF BLEACHING PROCESS

Paul Schaefer, Riehen, and Alfred Oetiker, Fribourg, Switzerland, assignors to Ciba Limited, Basel, Switzerland, a Swiss company
No Drawing. Filed Feb. 15, 1966, Ser. No. 527,514
Claims priority, application Switzerland, Mar. 2, 1965, 2,874/65
Int. Cl. G03c 1/40, 1/72
U.S. Cl. 96—73      7 Claims

ABSTRACT OF THE DISCLOSURE

Photographic material for the silver dye bleaching process. This material contains silver halide and at least one dye capable of being bleached imagewise. In addition, this material comprises in at least one colloid layer a dispersed hydrophilic resin which contains, dissolved in it, a quinoxaline as dye bleaching catalyst. The photographic material distinguishes itself by being free from the so-called trickle effect.

---

It is known that for bleaching certain azo dyes in the silver dye bleaching process a catalyst is needed which makes the bleaching time for different dyes as equal as possible and, wherever necessary, makes it possible to achieve a pure white tint. Such dye bleaching catalysts may be incorporated in one or several layers and/or added to a treatment bath, for example the silver bleaching bath. The incorporation of catalysts, especially those which are sparingly soluble to insoluble in water, may be advantageous in that such catalysts develop their activity only in this layer so that for every dye layer the catalyst best suitable for the particular dye can be used. It is, however, not easy to distribute this diffusion-resistant catalyst uniformly in the gelatin or in another photographic colloid. The resulting dispersions may be coarse so that the dyes are bleached unevenly, and this may lead to the so-called trickle effect. Moreover, the catalysts may desensitize the silver halide. The photographic material of this invention is free from these disadvantages.

The present invention provides a photographic material for the silver dye bleaching process containing a silver halide and at least one dye capable of being bleached imagewise, wherein there is dispersed in at least one layer thereof, preferably in a colloid layer that contains a silver halide and a dye that can be bleached imagewise, a hydrophilic resin containing a dye bleaching catalyst.

Materials of this composition are obtained by dispersing in a colloid, preferably in a photographic colloid containing a silver halide and a dye that can be bleached imagewise, an emulsion that contains an aqueous emulsion of a solution of a hydrophilic resin and of a dye bleahcing catalyst in an organic solvent, and coating a base with this dispersion and drying the layer.

As will be realized from the foregoing statements the manufacture of the photographic material starts from a solution of two substances, namely a hydrophilic resin and a dye bleaching catalyst, in an organic solvent. The solvent to be used must be capable of dissolving both the hydrophilic resin and the dye bleaching catalyst and should be immiscible with or preferably only very sparingly soluble in water. Furthermore, since the solvents must be removed again from the photographic layers by drying, they should have a high vapour pressure and/or a low boiling point. It is also advantageous if the solvents are capable of forming azeotropic mixtures with water. Accordingly, it is advantageous to select solvents that can be removed from the layer together with the water under the drying conditions suitable for photographic layers. Examples of such solvents are the hydrocarbons of the benzene series, for example, benzene, toluene and xylenes, alcohols as cyclohexanol, and especially chlorinated aliphatic hydrocarbons, for example methylene-chloride and especially 1,2-dichloroethane.

It is advantageous if the polymerization resins have a refractive index similar to that of the photographic colloid. In the case of gelating the refractive index of the resin is $n_D^{20°}=1.49$ to 1.55, preferably from 1.52 to 1.53 (this refractive index should be that of the dry resin, that is to say the resin free from solvent). Furthermore, the polymerization resin must be hydrophilic. This property is advantageously imparted to the polymerization resin by the incorporation of copolymerizable hydroxy compounds, amines as vinylpyridine, amide or imide compounds such, for example, as vinylpyrrolidone or preferably carboxylic acid. Mixtures of such copolymerizable compounds imparting solubility in water may also be used. As the base for the photographic layers must remain flexible, the polymerization resin must be sufficiently elastic and should not be too hard. Optimum refractive indices suitable for gelatin are displayed by styrene; however, since this monomer gives rise to hard polymers, it is advantageous to incorporate with it a further plasticizing component, for example n-butyl acrylate or methacrylate. As components capable of imparting the necessary hydrophility to the polymer there are suitable methacrylic and acrylic acid. Thus, it is advantageous to use for the manufacture of photographic materials based on gelatin polymerization, resins obtained by copolymerization of:

(a) 5 to 65% of styrene, vinylidene chloride or acrylonitrile (b) 25 to 90% of an alkyl ester of acrylic or methacrylic acid, whose alkyl residue contains, for example, 4 to 20 carbon atoms, such as butyl acrylate or methacrylate and (c) 5 to 30% of acrylic or methacrylic acid, 4-vinylpyridine or N-vinylpyrrolidone.

It is advantageous if the dye bleaching catalysts are free from acidic groups imparting solubility in water, for example sulphonic or carboxylic acid groups. It is preferable to use basic catalysts, especially those which owe their basicity to the presence of nitrogen atoms. As relevant examples there may be mentioned phenazine and quinoxaline compounds, inter alia quinoxalines that may be further substituted in position 2 and/or 3 and may contain an amino group in position 6 or 7. As substitutents in 2,3-position there may be mentioned lower alkyl groups and aryl groups such as methyl and phenyl groups.

It is advantageous to carry out the polymerization in the solvent used to dissolve the polymerization resin and the dye bleaching catalyst required for the preparation of the photographic layers by the present process. The polymerization may be carried out in the usual manner in the presence of catalysts capable of furnishing free radicals, such, for example, as azo compounds and/or peroxides. On completion of the polymerization, the amount of dye bleaching catalyst needed to produce the desired catalytic effect may then be added, if necessary after more of the organic solvent has been added.

The solution thus obtained is then emulsified in water, if necessary with the aid of a dispersant, for example an anionic dispersant such for example, as a sulphonate or salt of an acid sulphuric acid ester containing higher alkyl radicals. In general it is advantageous to raise the pH value of the emulsion, for example by adding ammonia, so as to bring it up to the level of the pH value of the photographic colloid, for example of the gelatin+silver halide emulsion, with which the emulsion containing the catalyst is to be incorporated. Such an emulsion can be mixed readily and homogeneously with the photographic layer material containing the colloid, preferably gelatin, silver halide and the bleachable dye, whereupon the coating may be carried out in the usual manner.

Photographic multi-layer material may contain in one or more than one layer dispersed resin admixed with dye bleaching catalysts, and in each layer there may be used a different catalyst to suit the individual dye. The resins present in the individual layers need not be identical.

In all other respects the photographic material of this invention may be manufactured and processed by known methods. In addition to the catalysts incorporated with the photographic material during its manufacture according to this invention there may be used further catalysts in processing the material, for example soluble catalysts may be added to a treatment bath, for instance to the developer or dye bleaching bath.

The following example illustrates the invention, the parts and percentages being by weight.

Manufacturing procedures

A. 80 parts of styrene, 80 parts of n-butyl methacrylate and 40 parts of methacrylic acid are dissolved in 125 parts of 1,2-dichloroethane and 10 parts of isopropanol. A quarter of this solution is heated to 85° C. Polymerization sets in on addition of a solution of 1 part of azodiisobutyronitrile in 5 parts of 1,2-dichloroethane. The remainder of the monomer solution is then mixed with a solution of 3 parts of azodiisobutyronitrile in 15 parts of 1,2-dichloroethane and introduced into the polymerization vessel within 6 hours. One hour after completion of this addition, a solution of 1 part of azodiisobutyronitrile in 10 parts of 1,2-dichloroethane is added, and the batch is further polymerized for about 15 hours and then cooled to room temperature. 3.6 parts of 2,3-diphenylquinoxaline are dissolved in 140 parts of this solution. While gradually adding to this solution 13.7 parts of 24% aqueous ammonia and 242 parts of water, it is turned into a homogeneous, very fine emulsion which after filtration has a solids content of about 20%.

B. 88 parts of styrene, 92 parts of n-butyl methacrylate and 20 parts of methacrylic acid are dissolved in 105 parts of 1,2-dichloroethane and 5 parts of isopropanol. A quarter of this solution is heated to 85° C. Polymerization sets in on addition of a solution of 0.75 part of azodiisobutyronitrile in 5 parts of 1,2-dichloroethane. The remainder of the monomer solution is then mixed with a solution of 2.25 parts of azodiisobutyronitrile in 15 parts of 1,2-dichloroethane and introduced into the polymerization vessel within 6 hours. One hour after completion of this addition a solution of 1 part of azodiisobutyronitrile in 10 parts of 1,2-dichloroethane is added, and the bath is further polymerized for about 14 hours and then cooled to room temperature.

108 parts of this solution are mixed with a solution of 3.25 parts of 2,3-diphenylquinoxaline in 9.4 parts of 1,2-dichloroethane, and a solution of 6.5 parts of sodium laurylsulphonate in 25 parts of water is added. While gradually adding to this mixture 6 parts of 24% aqueous ammonia and 125 parts of water, it is turned into a fine emulsion which after filtration has a solids content of about 29%.

C. Same procedure as B, but 4 parts of 24% aqueous ammonia are added to help disperse the resin.

D. and E. Same procedure as B, but the resin contains 2.5% or 10% of 2,3-diphenylquinoxaline.

F. Same procedure as A, but the resin contains 2.5% of 2,3-diphenylquinoxaline.

G. Same procedure as A, but the solvent is cyclohexanol and 2.5% of pyridine-3-carbonic acid-2',3'-diphenyl-quinolyl-(6')-amide are used as catalyst.

H. According to procedure B, 35 parts of styrene, 35 parts of n-butyl acrylate and 30 parts of methacrylic acid are dissolved in 5 parts of isopropanol and 65 parts of n-butanol and polymerized with the aid of 2.5 parts of azodiisobutyronitrile at 80° C. The solvent is distilled off in vacuo at the end of the polymerization. 60 parts of the remaining resin are diluted with a solution of 3 parts of 2,3-diphenylquinoxaline in 46 parts of 1,2-dichloroethane. While 14.8 parts of 24% aqueous ammonium and 155 parts of water are gradually added to this solution a very fine emulsion is formed which after filtration has a solids content of about 22%.

I. According to proceduree B, 40 parts of styrene, 40 parts of n-butyl methacrylate and 20 parts of 4-vinyl-pyridine are polymerized in 65 parts of 1,2-dichlorethane and 5 parts of isopropanol.

30 parts of the resulting solution are mixed with a solution of 0.96 part of 2,3-diphenylquinoxaline in 3 parts of 1,2-dichloroethane. While gradually adding to this solution 3.3 parts of 36% hydrochloric acid and 154 parts of water, it is turned into a homogenous emulsion which after filtration has a solids content of about 13%.

K. According to procedure B, 10 parts of styrene, 170 parts of n-butyl methacrylate and 20 parts of methacrylic acid are polymerized in 105 parts of n-butanol. An emulsion is prepared which contains 2.5% of the dyebleaching catalyst 2,3-diphenyl-6-amino-quinoxaline, calculated on the amount of resin present.

L. According to procedure B, 130 parts of styrene, 50 parts of n-butyl methacrylate and 20 parts of methacrylic acid are polymerized in 105 parts of benzene. An emulsion is prepared which contains 5% of the dyebleaching catalyst 2,3-dimethylquinoxaline, calculated on the amount of resin present.

M. According to procedure B, 130 parts of styrene, 50 parts of n-butyl acrylate and 20 parts of acrylic acid are polymerized. By dispersing the polymer an emulsion is obtained which contains 5% of the dyebleaching catalyst 2,3-di-(p-methoxy-phenyl)-quinoxaline, calculated on the amount of resin present.

N. Same procedure as M, but 5% of the dyebleaching catalyst 2,3-dimethylquinoxaline are used.

O. According to procedure B, 50 parts of styrene, 30 parts of n-butyl acrylate and 20 parts of 4-vinylpyridine are polymerized in 5 parts of isopropanol and 50 parts of 1,2-dichloroethane at 80° C. To 32 parts of 63% solution obtained are added 0.2 part of 2,3-dimethyl-6-amino-quinoxaline. While gradually adding to this solution 1.6 parts of 36% hydrochloric acid and 70 parts of water, it is turned into a homogenous emulsion which after filtration has a solids content of about 21%.

P. 130 parts of vinylidenechloride, 55 parts of n-butyl acrylate, 15 parts of acrylic acid and 2 parts of n-dodecylmercaptan are dissolved in 112 parts of 1,2-dichloroethane. One half of solution obtained is heated up to 52° C. After the addition of a solution of 1.5 parts of azodiisobutyronitrile in 10 parts of 1,2-dichloroethane polymerization sets in. To the other half of the monomer solution is added a solution of 1.5 parts of azodiisobutyronitrile in 10 parts of 1,2-dichloroethane. The resulting mixture is added within 60 minutes to the polymerization pot. 2 hours after the addition has been completed, 1 part of benzoylperoxide is added, and polymerization is continued for 4 hours at 65° C. Afterwards the polymer solution is cooled down to room temperature.

In 86.4 parts of this solution with a solids content of 55.5% are dissolved 2.4 parts of 2,3-dimethylquinoxaline, and 4.8 parts of sodium laurylsulphonate in 19.2 parts of water are added. While gradually adding to the resulting mixture 4 parts of 24% aqueous ammonia and 80 parts of water, it is turned into a homogeneous emulsion which after filtration has a solids content of about 36%.

Q. Same procedure as P, but the resin contains 1.2 parts of 2,3-diphenyl-6-amino-quinoxaline.

R. Same procedure as P, but the resin contains 0.48 part of the dye bleaching catalyst of the formula

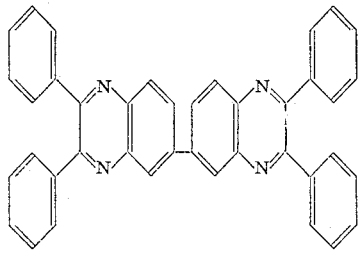

and to disperse the polymer 92 parts of water are used and the emulsion has a solids content of about 31.5%.

S. 90 parts of styrene, 95 parts of n-butyl acrylate and 15 parts of acrylic acid are preemulsified in a solution of 7 parts of sodium laurylsulphonate in 200 parts of water. One half of this preemulsion is heated up to 65° C. while stirring and passing through a nitrogen stream. A solution of 0.5 part of potassiumperoxydisulphate in 10 parts of water and a solution of 0.2 part of sodiummetabisulphite in 10 parts of water are added. After the beginning of the polymerization a solution of 0.5 part of potassiumpesoxydisulphate in 10 parts of water are added to the second half of the preemulsion. This mixture is added to the polymerization pot within 60 minutes. 30 minutes after the completed addition a solution of 0.2 part of sodiummetabisulphite in 10 parts of water are added and the polymerization is continued for three more hours at 65° C.

42.5 parts of the resulting 47% emulsion are diluted with 20 parts of water and the pH-value is adjusted to 6.5 by adding 10% aqueous ammonia. After the addition of a solution of 0.5 part of 2,3-di-(p-methoxy-phenyl)-quinoxaline in 16.5 parts of 1,2-dichloroethane, the mixture is stirred at room temperature for 30 minutes. After filtration an emulsion with a dry solids content of about 25% is obtained.

T. According to procedure S, 90 parts of styrene, 95 parts of n-heptyl acrylate and 15 parts of acrylic acid are polymerized. 42.5 parts of the resulting 47% emulsion are diluted with 20 parts of water and the pH-value is adjusted to 6 with 10% aqueous ammonia. A solution of 1 part 2,3-diphenylquinoxaline in 16 parts of benzene are added and the mixture is stirred at room temperature for 30 minutes. After filtration an emulsion with a dry solids content of about 26% is obtained.

U. According to procedure S, 20 parts of acrylonitrile, 168 parts of n-octyl acrylate and 12 parts of acrylic acid are polymerized in 240 parts of water. 67 parts of the 30% emulsion whose pH-value has been adjusted to 6 with 10% aqueous ammonia are mixed with a solution of 1 part of 2,3-diphenylquinoxaline in 16 parts of 1,2-dichloroethane and stirred at room temperature for 30 minutes. After filtration an emulsion with a dry solids content of about 26% is obtained.

V. 40 parts of styrene, 40 parts of n-butyl acrylate and 20 parts of N-vinylpyrrolidone are preemulsified or dissolved respectively in a solution of 2.5 parts of sodium laurylsulphonate in 180 parts of water. One half of this preemulsion is warmed up to 60° C. and 0.25 part of 35% hydrogen peroxide are added. 10 minutes later 0.25 part of 35% hydrogen peroxide is added to the second half of the preemulsion. This mixture is added to the polymerization pot within 60 minutes. Polymerization is continued for 6 hours. Afterwards small shares of monomers are removed by passing through nitrogen for 10 minutes. With aqueous 10% ammonia the pH-value is adjusted to 8 to 8.5.

50 parts of the 33.4% emulsion are diluted with 5 parts of water and mixed with a solution of 0.42 part of 2,3-dimethylquinoxaline in 10 parts of 1,2-dichloroethane. After filtration an emulsion with a dry solids content of about 26% is obtained.

In the following Table I, the emulsions A to V are listed again all together.

TABLE I

| Resin-dye bleaching catalyst emulsion | Composition of the resin | Dye bleaching catalyst | Percent wt. of dye bleaching catalyst per dry resin | Solids content of emulsion, percent |
|---|---|---|---|---|
| A | Styrene, 40%; n-butyl methacrylate, 40%; methacrylic acid, 20%. | 2,3-diphenylquinoxaline | 5 | 20 |
| B | Styrene, 44%; n-butyl methacrylate, 46% methacrylic acid, 10%. | do | 5 | 29 |
| C | Styrene, 45%; n-butyl methacrylate, 47.5%; methacrylic acid, 7.5%. | do | 5 | 27 |
| D | Styrene, 44%; n-butyl methacrylate, 46%; methacrylic acid, 10%. | do | 2.5 | 25 |
| E | do | do | 10 | 25 |
| F | Styrene, 40%; n-butyl methacrylate, 40%; methacrylic acid, 20%. | do | 2.5 | 24 |
| G | Styrene, 40%; n-butyl methacrylate, 40%; methacrylic acid, 20%. | Pyridin-3-carboxylic acid 2',3'-diphenyl-equinolyl-(6')-amide. | 2.5 | 19 |
| H | Styrene, 35%; n-butyl methacrylate, 35%; methacrylic acid, 30%. | 2,3-diphenylquinoxaline | 5 | 22 |
| I | Styrene, 40%; n-butyl methacrylate, 40%; 4-vinylpryridine, 20%. | do | 5 | 13 |
| K | Styrene, 5%; n-butyl methacrylate, 85%; methacrylic acid, 10%. | 2,3-diphenyl-6-amino-quinoxaline | 2.5 | 25 |
| L | Styrene, 65%; n-butyl methacrylate, 25%; methacrylic acid, 10%. | 2,3-diphenylquinoxaline | 5 | 25 |
| M | Styrene, 65%; n-butyl acrylate, 25%; acrylic acid, 10%. | 2,3-di-(p-methoxyphenyl)-quinoxaline. | 5 | 25 |
| N | Styrene, 65%; n-butyl acrylate, 25%; acrylic acid, 10%. | 2,3-dimethylquinoxaline | 5 | 25 |
| O | Styrene, 50%; n-butyl acrylate, 30%; 4-vinylpyridine, 20%. | 2,3-dimethyl-6-aminoquinoxaline | 1 | 21 |
| P | Vinylidenechloride, 65%; n-butyl acrylate, 27.5%; acrylic acid, 7.5%. | 2,3-dimethylquinoxaline | 5 | 36 |
| Q | do | 2,3-dimethyl-6-aminoquinoxaline | 2.5 | 36 |
| R | do | 6-bis-(2,3-diphenylquinoxaline) | 1 | 31.5 |
| S | Styrene, 45%; n-butyl acrylate, 47.5%; acrylic acid, 7.5%. | 2,3-di-(p-methoxyphenyl)-quinoxaline | 2.5 | 25 |
| T | Styrene, 45%; n-heptyl acrylate, 47.5%; acrylic acid, 7.5%. | 2,3-diphenylquinoxaline | 5 | 26 |
| U | Acrylonitrile, 10%; n-octyl acrylate, 84%; acrylic acid, 6%. | do | 5 | 26 |
| V | Styrene, 40%; n-butyl acrylate, 40%; N-vinylpyrrolidone, 20%. | do | 2.5 | 26 |

Example 1 kilogram of a high-speed silver bromide-iodide emulsion containing 7% of gelatin is mixed at 40° C. by a known method with a red sensitizer and the conventional casting additives for example stabilizer, wetting agent, hardening agent and the cyan image dye of the formula

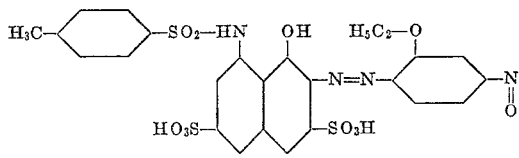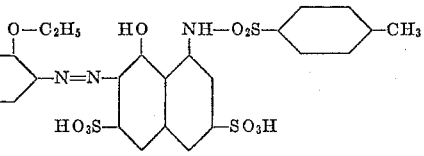

40 millilitres of any one of the resin-catalyst emulsions A to V is first diluted at room temperature with 80 ml. of water and likewise stirred into the silver halide emulsion. The batch is then filtered and the desired viscosity is adjusted by stirring in the requisite amount of water. A layer of 6-micron thickness (in the dry state) is then produced on a photographic base at a casting temperature of 40° C. and a casting speed of 6 metres per minute.

The resulting layer is then covered in the usual manner with a green-sensitized purple layer containing the image dye of the formula

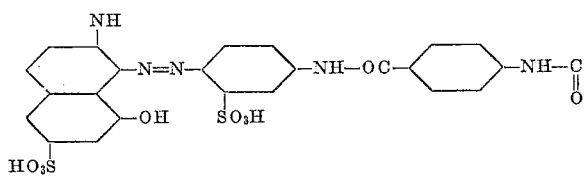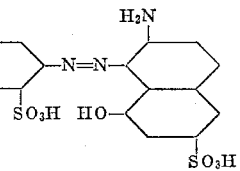

and a blue-sensitized layer containing the yellow image dye of the formula

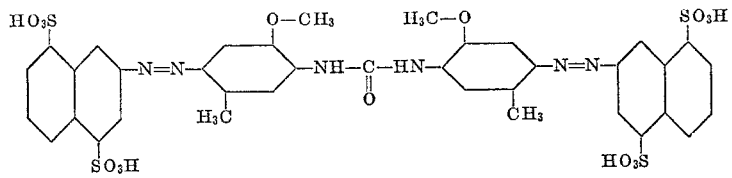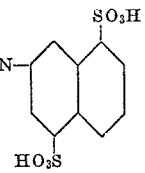

and finally with a protective coating.

The resulting photographic material is exposed through a neutral wedge to red, green and blue light, developed in a bath containing 1-methylamino-4-hydroxybenzenesulphonate and hydroquinone, immersed in a stop bath cotaining acetic acid, washed in water for one minute and then treated in a dye bleaching bath consisting of 20 parts by volume of hydrochloric acid of 37% strength, 20 parts of thiourea and water to make 1000 parts by volume. The appropriate duration of the treatment, established by preliminary tests, is chosen so that it just suffices to bleach the dyes completely in highly exposed areas. The residual silver bromide and the residual silver are then dissolved and washed out by the usual method.

A material manufactured for comparative tests, which contained as bleaching catalyst only 2,3-diphenylquinoxaline (but no resin dispersion) and had otherwise the same composition, revealed an uneven bleaching of the image dyes. The specimens tested displayed a trickle effect caused by catalyst which had settled out in coarsely disperse flocks.

What is claimed is:

1. Photographic material for use in the silver dye bleaching process, containing silver halide and at least one dye capable of being bleached imagewise, which comprises in at least one colloid layer thereof a dispersed hydrophilic resin having a refractive index similar to that of the colloid, said resin containing a dye bleaching catalyst selected from the group consisting of phenazines and quinoxalines.

2. Photographic material according to claim 1 for use in the silver dye bleaching process, containing silver halide and at least one dye capable of being bleached imagewise, which comprises in a gelatin layer thereof a dispersed hydrophilic resin having a refractive index similar to that of gelatin, said resin containing a dye bleaching catalyst selected from the group consisting of phenazines and quinoxalines.

3. Photographic material according to claim 1 for use in the silver dye bleaching process, containing silver halide and at least one dye capable of being bleached imagewise, which comprises in a gelatin layer thereof a dispersed hydrophilic resin having a refractive index similar to that of gelatin that owes its hydrophility to the presence of carboxylic acid groups, said resin containing a quinoxaline as dye bleaching catalyst.

4. Photographic material according to claim 1 for use in the silver dye bleaching process, containing silver halide and at least one dye capable of being bleached imagewise, which comprises in a gelatin layer thereof a dispersed resin produced by copolymerization of (a) 5 to 65% by weight of a member selected from the group consisting of styrene, vinylidenechloride and acrylonitrile, (b) 25 to 90% by weight of a member selected from the group consisting of an acrylic acid alkyl ester and a methacrylic acid alkyl ester, and (c) 5 to 30% by weight of a member selected from the group consisting of acrylic acid, methacrylic acid, 4-vinylpyridine and N-vinylpyrrolidone, and this resin contains a dye bleaching catalyst selected from the group consisting of phenazines and quinoxalines.

5. Photographic material according to claim 1 for use in the silver dye bleaching process, containing silver halide and at least one dye capable of being bleached imagewise, which comprises in a gelatin layer thereof a dispersed resin with a refractive index $n_D^{20°\,C.}$ from 1.49 to 1.55 produced by copolymerization of (a) 5 to 65% by weight of a member selected from the group consisting of styrene, vinylidenechloride and acrylonitrile, (b) 25 to 90% by weight of a member selected from the group consisting of an acrylic acid alkyl ester and a methacrylic acid alkyl ester, and (c) 5 to 30% by weight of a member selected from the group consisting of acrylic acid, methacrylic acid, 4-vinylpyridine and N-vinylpyrrolidone, and this resin contains a dye bleaching catalyst selected from the group consisting of phenazines and quinoxalines.

6. Photographic material according to claim 1 for use in the silver dye bleaching process, containing silver halide and at least one dye capable of being bleached imagewise, which comprises in at least one colloid layer thereof a dispersed hydrophilic resin having a refractive index similar to that of the colloid, said resin containing a member selected from the group consisting of a 2,3-dimethylquinoxaline, 2,3 - diphenylquinoxaline, 2,3 - diphenyl-6-amino-quinoxaline and 2,3 - di - (p - methoxyphenyl)-quinoxaline as dye bleaching catalyst.

7. Photographic material according to claim 1 for use in the silver dye bleaching process, containing silver halide and at least one dye capable of being bleached imagewise, which comprises the hydrophilic resin containing the dye bleaching catalyst having a refractive index similar to that of the colloid dispersed in a colloid layer containing a dye capable of being bleached imagewise.

References Cited

UNITED STATES PATENTS

| | | | |
|---|---|---|---|
| 2,183,395 | 12/1939 | Gaspar | 96—73 |
| 2,410,025 | 10/1946 | Gaspar | 96—53 |
| 3,278,303 | 10/1966 | Meyer et al. | 96—53 |

J. TRAVIS BROWN, Primary Examiner

U.S. Cl. X.R.

96—20, 53, 99